US006806421B2

(12) United States Patent
Matsumura

(10) Patent No.: US 6,806,421 B2
(45) Date of Patent: Oct. 19, 2004

(54) FUSE UNIT

(75) Inventor: Norio Matsumura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 204 days.

(21) Appl. No.: 10/134,495

(22) Filed: Apr. 30, 2002

(65) Prior Publication Data

US 2002/0163416 A1 Nov. 7, 2002

(30) Foreign Application Priority Data

May 1, 2001 (JP) .................................... P2001-134492

(51) Int. Cl.[7] .................................................. H02G 3/08

(52) U.S. Cl. ............................ 174/50; 174/59; 220/3.2; 337/290

(58) Field of Search ............................ 174/50, 135, 66, 174/138 F, 59, 60, 65 R; 220/3.2, 4.02, 241, 242; 439/621, 622, 890, 522, 763, 521, 202, 904; 337/295, 256, 159, 161, 292, 112; 16/260, 261, 266; 361/104; 307/9.1

(56) References Cited

U.S. PATENT DOCUMENTS 4,531,806 A * 7/1985 Hsieh ......................... 439/621
5,645,448 A * 7/1997 Hill ............................ 439/763
5,790,007 A 8/1998 Yasukuni
5,805,047 A * 9/1998 De Villeroche et al. .... 337/295
6,294,978 B1 * 9/2001 Endo et al. ................. 337/159
6,509,824 B2 * 1/2003 Inaba et al. ................. 337/295
6,512,443 B1 * 1/2003 Matsumura et al. ........ 337/161
6,576,838 B2 * 6/2003 Matsumura .................. 174/50

FOREIGN PATENT DOCUMENTS

EP 1 124 246 A 8/2001
JP 10-220424 8/1998
JP 10-338085 12/1998

* cited by examiner

*Primary Examiner*—Dean A. Reichard
*Assistant Examiner*—Angel R. Estrada
(74) *Attorney, Agent, or Firm*—Sughrue Mion, PLLC

(57) ABSTRACT

A restricting wall (53) confronting an inner face wall (32*b*) of a first divided body (32) is stood on an inner face wall (33*b*) of a second divided body (33). The restricting wall (53) is provided with an inclined wall surface (53*b*) inclined away from the inner face wall (32*b*) of the first divided body (32). A tipping-resistant rib (54) is provided at both end portions of the restricting wall (53). The first divided body (32) is provided with a flexible arm (51) having a latch (57), and the restricting wall (53) of the second divided body (33) is provided with a notch (52), constituting first locking mechanism. The first divided body (32) is provided with an engaging projection, and the second divided body (33) is provided with an engagement groove (56) engageable with the engaging projection, as second locking mechanism. An engagement groove (56) is provided on an extension wall (36) of the second divided body (33).

12 Claims, 8 Drawing Sheets

FUSE UNIT

The present application is based on Japanese Patent Application No. 2001-134492, which is incorporated herein by reference.

BACKGROUND OF THE INVENTION

1. Field of the Invention

The present invention relates to a fuse unit attached directly to a vehicle mounted battery, and having a fusible portion in supplying an electric power from the battery to the electric wire.

2. Related Art

FIGS. 10 and 11 show one form of the conventional fuse unit.

A fuse unit 101 connects a vehicle mounted battery with the electric wire for power supply, and comprises a plate-like fuse element 110 made of conductive metal having a fusible portion (not shown), and an insulating resin body 120 having the fuse element 110 insert molded.

As shown in FIG. 10, this resin body 120 is sprit into the front and rear divided bodies 121 and 122 which are extended in one-dimensional direction. Further, in use, the divided bodies 121 and 122 are bent like an L-character shape at an intermediate section, as shown in FIG. 11. Since the previous fuse unit bent like L-character shape at the time of molding takes a lot of time to perform the punching process, the conventional example facilitates the punching process and makes the resin body 120 bendable to solve this problem.

Both the divided bodies 121 and 122 are bent like L-character shape by a locking mechanism constituted by an engaging projection 125 and an engagement groove 126 and fixed. The engaging projection 125 is formed to project from a side face wall 127 rearward of a front divided body 121 (to the left in FIG. 10), and the engagement groove 126 is provided on a side face wall 128 forward of a rear divided body 122 (to the right in FIG. 10). When the engaging projection 125 engages the engagement groove 126, both the divided bodies are maintained in the L-character bent form.

This fuse unit 101 is used in L-character bent form, because the fuse unit 101 can be restrained from increasing in size (total length) due to an increased set number of fusible portions (greater fuse circuit) to incorporate a more diverse or complex form of the circuit into a narrow space around a battery post.

The fuse element 110 is punched from one sheet of conductive metal plate, having integrally a flexible portion 111 in the intermediate section to be freely bendable in a direction of plate thickness from the flexible portion 111. The flexible portion 111 is disposed in a portion of a resin metal mold (not shown) into which a resin material is not injected, so that the flexible portion 111 is exposed outside the resin body 120.

The fusible portion serves to protect the electrical parts by melting when there is an overcurrent flowing, and is constituted by a metal chip of tin or lead alloy. The fusible portion is provided at each of both front and rear sides of the fuse element 110, and located within a space area (not shown) of the resin body 120 to be visible.

With this constitution, the resin body 120 can be molded integrally in a state where the fuse element 110 is expanded in plane, whereby there is no need of molding the resin body in the bent shape as conventionally performed, the punching direction is only met with the 180 degree direction, the metal mold is simplified with lower cost, and the fuse unit 101 of complex shape can be easily molded.

However, when the divided bodies 121 and 122 that are sprit forward and rearward were bent around the flexible portion 111 of the fuse element 110 as the center of rotation, they might be bent excessively because there was no stopper for restricting the bending, bringing about the risk that the divided bodies 121 and 122 were unlocked. Additionally, there was a problem that due to a spring back of the rear divided body 122 tending to return, the divided bodies were unlocked and not maintained in the L-character bent form. This is because the flexible portion 111 is formed in smaller thickness to be easily bendable and have insufficient strength, and is likely to deform due to an external force, whereby the divided bodies can not be maintained in the L-character bent form only by the flexible portion 111.

Further, if the divided bodies are not maintained in L-character bent form, it is permitted to fit smoothly a partner connector (not shown) into a connector housing 123 of the rear divided body 122 vertically stood along the side wall surface of the battery, causing a risk of interfering with the outside from the narrow space around the battery.

SUMMARY OF THE INVENTION

The present invention has been achieved in the light of the above-mentioned problems, and it is an object of the invention to provide a fuse unit that has improved reliability of locking mechanism for the fuse unit and is maintained in the L-character bent form.

In order to accomplish the above object, according to one aspect of the present invention, there is provided a fuse unit comprising an electrically conductive fuse element having a plurality of fusible portions and formed with a flexible portion in an intermediate section, and a resin body containing the fuse element, the resin body being divided into a first divided body and the second divided body at the boundary of the flexible portion, the first divided body and the second divided body being bendable, characterized in that a restricting wall confronting an inner face wall of the first divided body is stood on an inner face wall of the second divided body.

With this constitution, the restricting wall stood on the second divided body makes contact with the inner face wall of first divided body that is the partner, thereby acting as a stopper wall against an external force in a bending direction, when both the divided bodies are bent.

In the fuse unit, the restricting wall may be provided with an inclined wall surface inclined in a direction away from the inner face wall of the first divided body.

With this constitution, if the restricting wall is provided with the inclined wall surface, the divided bodies can be bent over 90 degrees in locking, and maintained in the L-character bent form without causing a spring back, after locking.

In the fuse unit, the first divided body may be provided with a flexible arm having a latch, and the restricting wall of the second divided body may be provided with a notched wall portion, wherein a first locking mechanism may be constituted by the flexible arm and the notched wall portion.

With this constitution, if the locking mechanism is constituted by the flexible arm having the latch and the notch, the flexible arm is inserted through an opening of the notch, when the divided bodies in one dimensional direction are bent to be disposed in an orthogonal direction, whereby the divided bodies are bent in L-character form and completely locked.

In the fuse unit, the first divided body may be provided with an engaging projection, and the second divided body may be provided with an engagement groove that is engaged by the engaging projection, wherein a second locking mechanism may be constituted by the engaging projection and the engagement groove.

With this constitution, if the second locking mechanism is constituted by the engaging projection and the engagement groove, the engaging projection and the engagement groove are engaged, when the divided bodies are bent, so that the fuse unit is locked without rattling and the divided bodies are maintained in the L-character bent form.

In the fuse unit, the flexible arm may be provided on the inner face wall of the first divided body, the engaging projection may be provided on a side face wall of the first divided body, and the engagement groove may be provided on an extension wall from the side face wall of the second divided body.

With this constitution, the flexible arm provided on the first divided body is inserted through an opening into the notch of the second divided body, when the divided bodies are bent, so that both the divided bodies are bent in the L-character form to effect the first lock. At the same time, the engaging projection provided on the side face wall of the one resin body engages the engagement groove on the extension wall from the second divided body, thereby effecting the second lock. Since the extension wall has the flexibility, the second lock is not released abruptly.

In the fuse unit, the flexible arm may be located closer to the flexible portion, and disposed in the center of the inner face wall of the first divided body.

With this constitution, the flexural rigidity of the restricting wall can be prevented from being decreased without forming the restricting wall having the notched wall portion engaged by the flexible arm at great height. Also, when an abrupt external force is applied on the fuse unit of the L-character bent form in the expanding direction, the external force is distributed uniformly on the latch of the flexible arm, thereby preventing the lock from being released.

In the fuse unit, the notched wall portion may be formed to be thicker than the wall thickness of the restricting wall.

With this constitution, the strength of the notched wall portion is increased, and the plastic deformation is prevented, whereby the latch of the flexible arm is prevented from getting out of the notch, even if an abrupt external force is applied in the expanding direction.

In the fuse unit, a tipping-resistant rib may be provided at both ends of the restricting wall.

With this constitution, since the tipping-resistant rib is provided, the flexural rigidity of the restricting wall is increased, whereby when the fuse unit is bent excessively over a desired bending angle or an abrupt external force is exerted in the bending direction, the restricting wall is prevented from being deformed against the external force.

DETAILED DESCRIPTION OF THE PREFERRED EMBODIMENT

Figure 1:
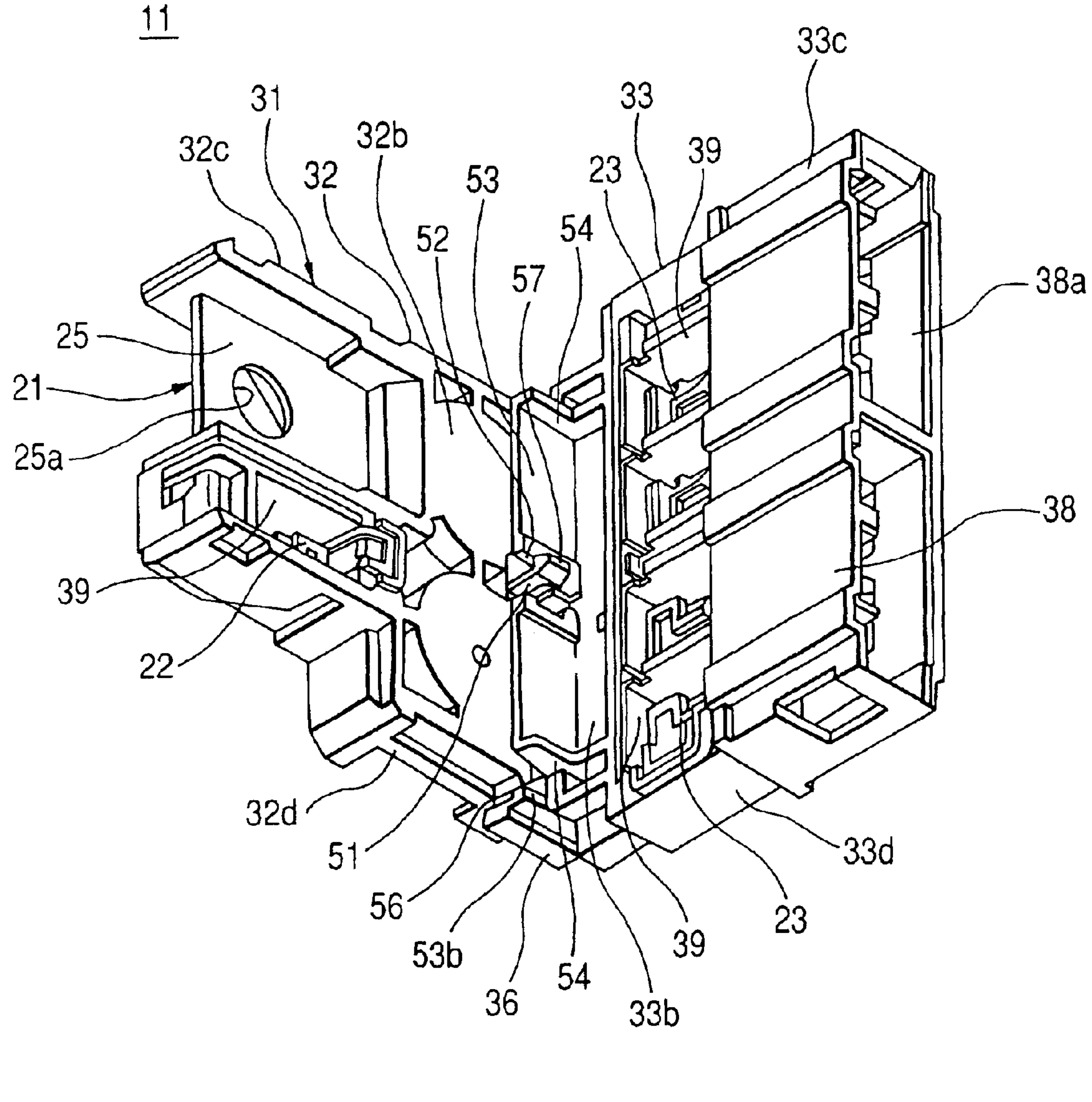
FIG. 1 is a perspective view showing a fuse unit according to one embodiment of the present invention.

The preferred embodiments of the present invention will be described below in detail with reference to the accompanying drawings.

FIGS. 1 to 9 show a fuse unit according to one embodiment of the invention. The fuse unit 11 connects a battery 71 (see FIG. 9) and an electric wire 81 (see FIG. 9) for power supply, and comprises a plate-like fuse element 21 made of a conductive metal and having the fuses 22 and 23 (fusible portion), and an insulating resin body 31 with the fuse element insert molded.

Figure 2:
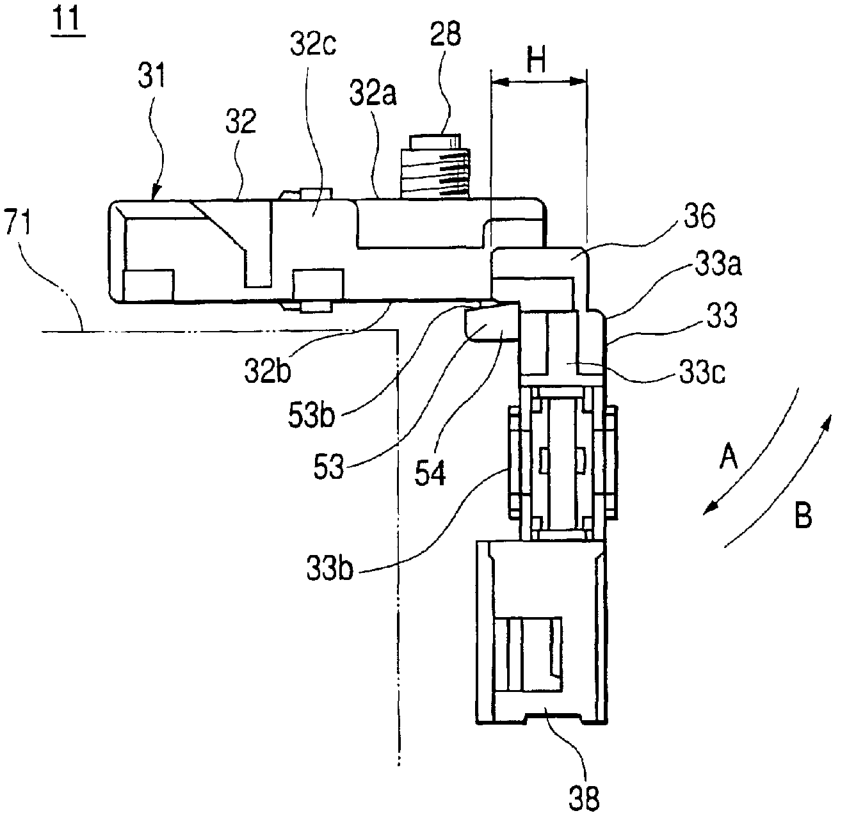
FIG. 2 is a front view of the fuse unit as shown in FIG. 1.
Figure 3:
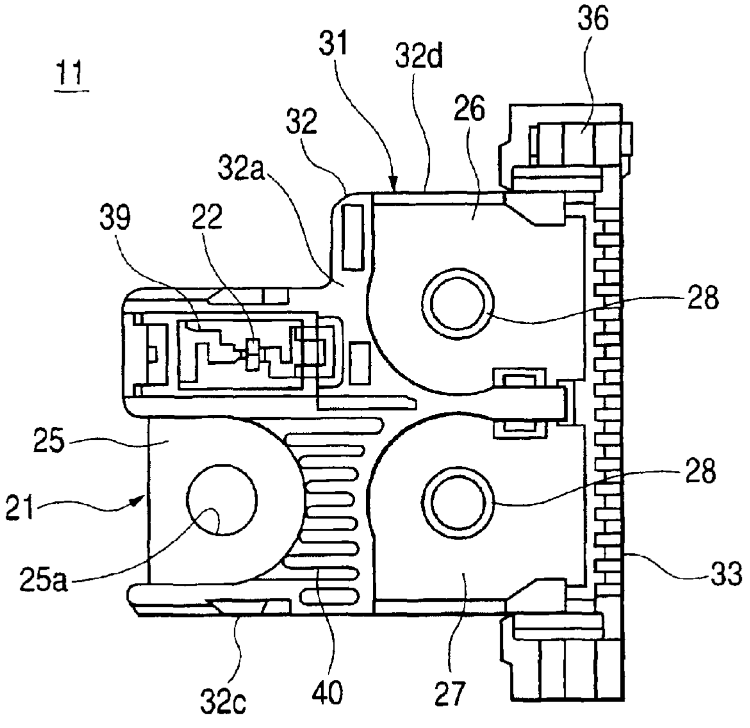
FIG. 3 is a plan view of the fuse unit.
Figure 4:
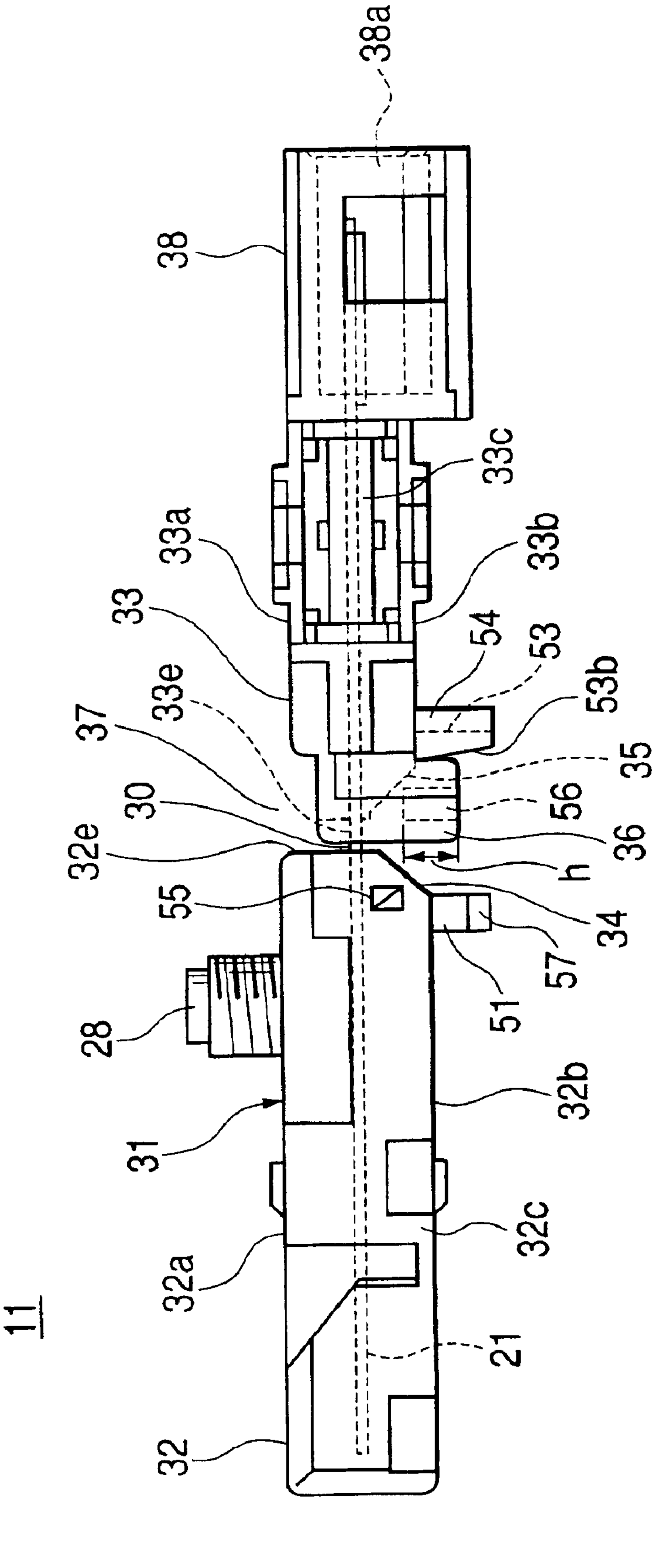
FIG. 4 is a front view of the fuse unit of FIG. 1 in an expanded state.
Figure 5:
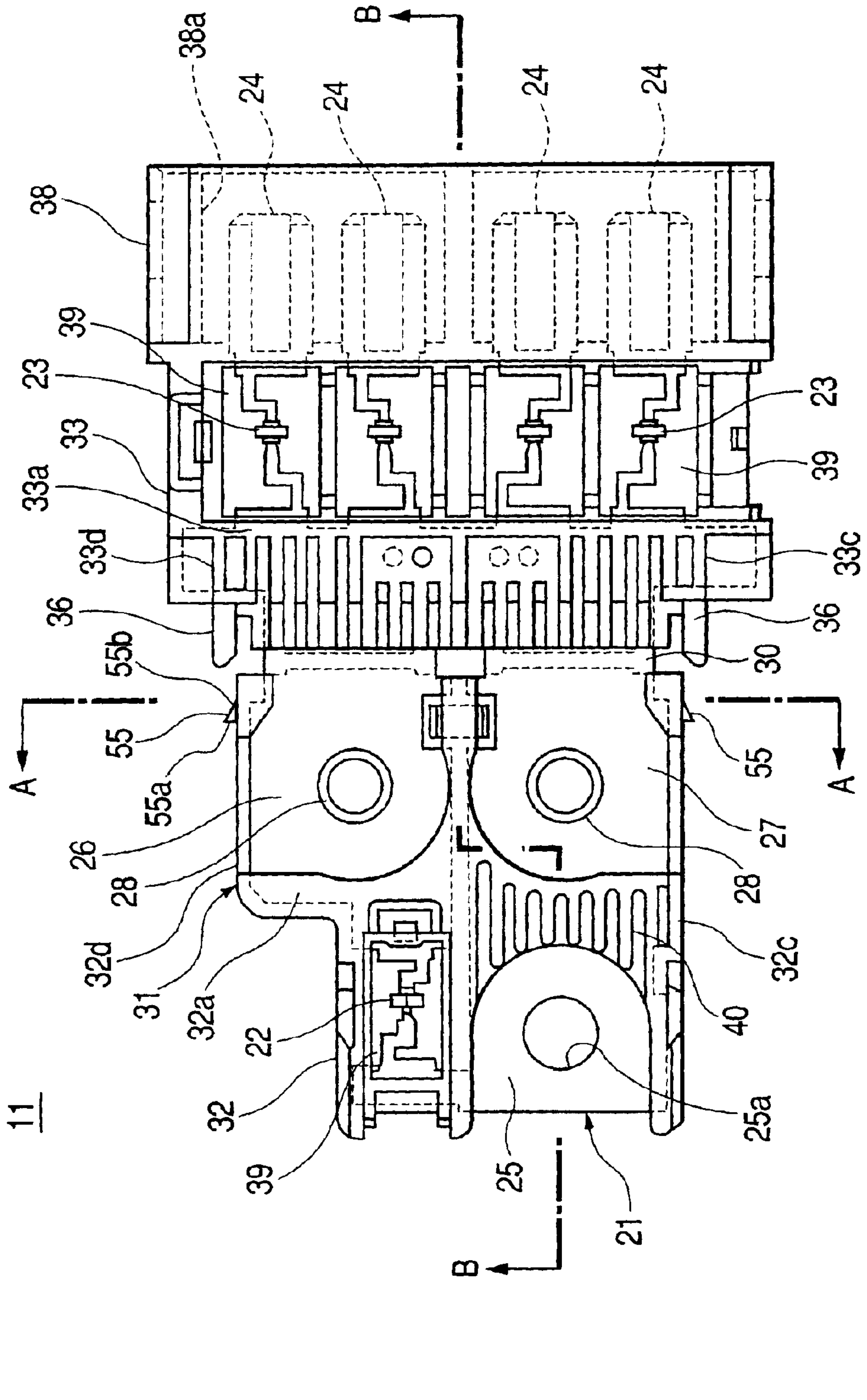
FIG. 5 is a plan view of the fuse unit as shown in FIG. 4.
Figure 6:
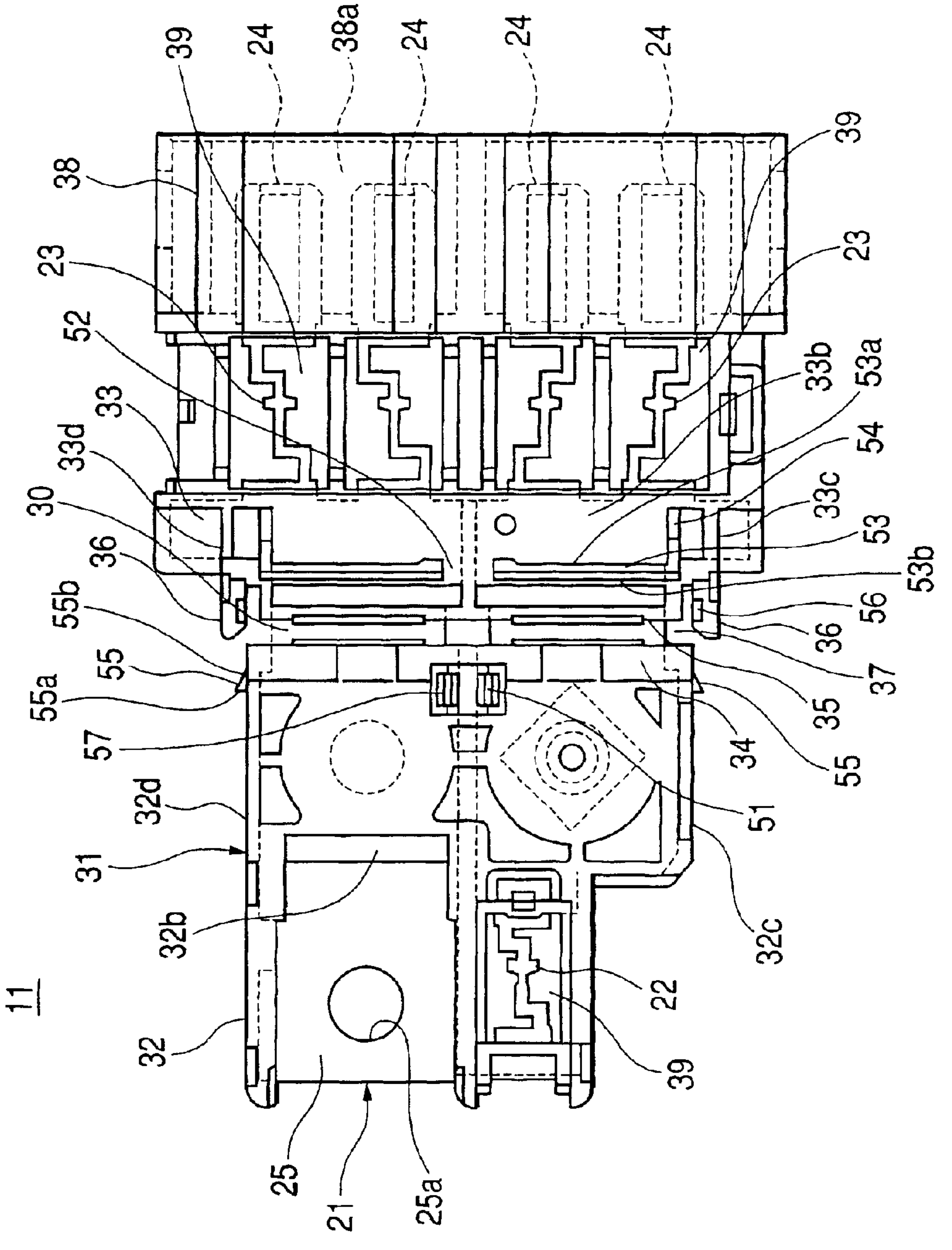
FIG. 6 is a bottom view of the fuse unit.

The fuse unit 11 as shown in FIGS. 1 to 3 is bent at about 90 degrees from the intermediate part, but is molded in an extended state in one dimensional direction (see FIGS. 4 to 6). This is because the punching process is facilitated. The fuse unit 11 is bent, when assembled, but if the entire length of the fuse unit 11 is increased, the fuse unit 11 may project outwards to interfere with the electrical parts around a battery post 72, as explained in the section of related art.

The fuse element 21 (see FIG. 4) is punched from one sheet of conductive metal plate, and has integrally a flexible hinge portion 30 (flexible portion) in the intermediate section to be bent freely around the hinge portion 30 as the center of rotation. The hinge portion 30 is flexible enough if it has the same plate thickness as the fuse element 21. In this embodiment, the hinge portion 30 is formed like a plate, but may be curved upwards like an almost circular arc. Also, the hinge portion 30 is disposed in a portion (a gap portion of resin body) of the resin metal mold (not shown) into which a resin material is not injected, and is exposed outside the resin body 31.

Four tab terminals 24 (see FIGS. 5 and 6) are disposed in parallel at the end portion of the conductive metal plate disposed vertically with the hinge portion 30 as the boundary. Each tab terminal 24 is continued to the fuses 22 and 23 exposed from the resin body 31. The tab terminal 24 is positioned to project into a connector fitting room 38*a* of a female connector housing 38 integral with the resin body 31. A female connector is constituted by the tab terminal 24 and the female connector housing 38.

The conductive metal plate placed horizontally is formed with a terminal connection 25 of a battery terminal 61, a terminal connection 27 of a stator motor terminal 64, and a terminal connection 26 of an alternator terminal 63. The fuse 22 is provided between the terminal connection 25 of the battery terminal 61 and the terminal connection 26 of the alternator terminal 63.

The fuses 22 and 23 are provided on both front and rear sides of the fuse element 21, located within a space area 39 of the resin body 31, and constituted by a metal chip of tin or lead alloy.

The resin body 31 comprises a front divided body 32 (first divided body) and a rear divided body 33 (second divided body) that are located forward and rearward with a gap portion 37 (see FIG. 4) as the boundary. From the gap portion 37, the hinge portion 30 of the fuse element 21 is exposed to allow the fuse element 21 or fuse unit 11 to be bent. In other words, the fuse element 21 or the fuse unit 11 can not be bent without the gap portion 37.

The resin body 31 contains the fuse element 21 intermediately in a height direction. In this specification, for the sake of convenience, the battery 71 connecting side and the tab terminal 24 side are defined as the front side and the rear side across the hinge portion 30, respectively. A direction in which the hinge portion 30 extends, orthogonal to the longitudinal direction, that is, a vertical direction to the paper face as shown in FIG. 4, is defined as the left and right direction (width direction).

FIGS. 4 to 6 are views showing a state where the resin body 31 is expanded, in which the front divided body 32 and the rear divided body 33 extend in one-dimensional direction. By molding in this manner, the terminal connecting portions 25, 26 and 27 and the space area portion 39 for the resin body 31 are punched in the 180-degree direction, whereby the structure of the metal mold is simplified, and the molding is facilitated.

As shown in FIG. 4, the inclined faces 34 and 35 having an inclination angle of about 45 degrees are continued under the opposed end face walls 32*e* and 33*e* of both the divided bodies 32 and 33 opposed across the hinge portion 30. Both the inclined faces 34 and 35 are confronted at an opening angle of about 90 degrees. Both the inclined faces 34 and 35 act as the contact face when the divided bodies 32 and 33 are bent.

The resin body 31 is divided into the front divided body 32 and the rear divided body 33 disposed vertically, as described above. The rear divided body 33 is stood vertically along a side wall surface 71*a* of the battery 71 in a state where it is bent at about 90 degrees (see FIG. 9).

As shown in FIG. 5, the front divided body 32 contains the fuse element 21 having the terminal connections 25, 26 and 27 and the fuse 22. The terminal connection 25 of the battery terminal 61 is exposed forward, and the terminal connection 27 of the stator motor terminal 64 and the terminal connection 26 of the alternator terminal 63 are exposed backward from the resin body 31. A connecting face is formed corresponding to the shape of each terminal 61, 63 and 64 (see FIG. 9) and has the shape of rectangle or a combination of rectangle and semicircle. Substantially in the center of the terminal connections 26 and 27, a stud bolt 28 is inserted at the time of insert molding, with its head portion projecting vertically to the connecting face.

The rear divided body 33 contains the fuse element 21 having the chained fuses 23 continuing to the tab terminals 24 arranged in parallel. The fuses 23 are located in the space area portion 39 of the rear divided body 33, and covered on the upper and lower sides with a rectangular plate (not shown) having a transparent window. The tab terminals 24 are arranged in parallel at an equal pitch, and project into a connector fitting room 38*a*.

As shown in FIGS. 1 to 3, the fuse unit 11 is used in the L-character bent form where the front divided body 32 and the rear divided body 33 are bent orthogonally at about 90 degrees. To retain the bent form, a dual locking mechanism is employed in this invention. That is, a first locking mechanism employs the constitution of the lock with higher reliability against an abrupt external force, while a second locking mechanism employs the constitution that can prevent the rattle and retain the L-character bent form.

First of all, the first locking mechanism is constituted by a pair of lock arms 51 (flexible arms) provided on the inner face wall 32*b* of the front divided body 32, and a notched wall portion 52 in which a notch is formed for engaging the lock arm 51.

Figure 7:
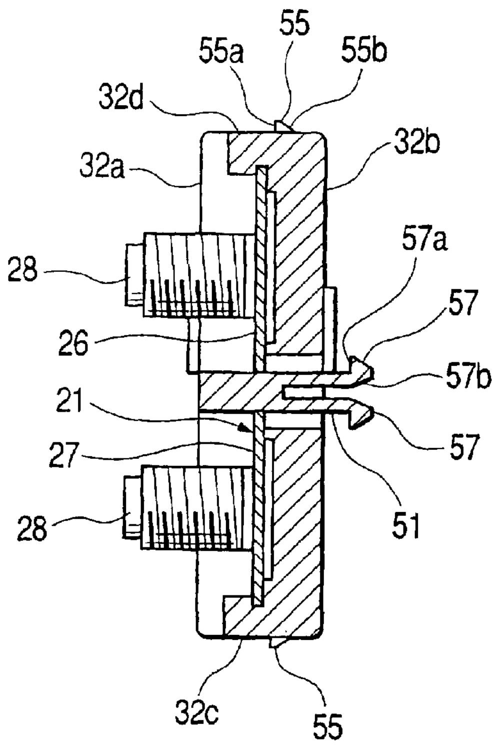
FIG. 7 is a cross-sectional view of the fuse unit of FIG. 5, taken along the line A—A.

As shown in FIG. 7, the lock arm 51 is constituted by a thin plate member, and provided with a latch 57 for keeping the lock at its top end. The flexible plate member is disposed with its plate thickness direction coincident with the left and right direction (width direction) of the resin body, and flexible in the left and right direction. Being flexible in the left and right direction (inward), the latch 57 and the notched wall portion 52 are engaged more easily.

The lock arm 51 is located closer to the hinge portion 30, and in the center of the inner face wall 32*b*. If the lock arm 51 is disposed at a location away from the hinge portion 30, the restricting wall 53 having the notched wall portion 52 engaged by the lock arm 51 must be formed at more height. Thereby, the restriction wall 53 has a lower flexural rigidity and can not fulfill the intrinsic function of restricting wall to restrict the bending. The restricting wall 53 will be described later.

The latch 57 is formed like a pawl or a hook, and has a latch face 57*a* contact with a rear wall surface 53*a* of the restricting wall 53, and a flank 57*b* beveled in a direction away from a pair of latches 57. The latch face 57*a* is a vertical face orthogonal to the direction where the lock arm 51 extends. The flank 57*b* is an inclined face to prevent interference when both the latches 57 are flexed to approach each other.

The notched wall portion 52 (see FIG. 6) is provided in the center of the restricting wall 53 to correspond to the position of the lock arm 51. The depth of notch is set to about two-thirds the height of the restricting wall 53 (see FIG. 1). If the notch is swallow, the divided bodies 32 and 33 can not be bent almost at right angles. Conversely, if the notch is too deep, the flexural rigidity of the restricting wall 53 is lowered.

If the above constitution is applied to the fuse unit 11, first of all, a pair of lock arms 51 are inserted into the notched wall portion 52 of the rear divided body 33, flexed (inwards) to approach each other to force the latches 57 to enter gradually deeply, and return resiliently when the divided bodies are bent like the L-character, whereby the lock is completed.

After the lock, the latch face 57*a* of the latch 57 makes contact with the rear wall surface 53*a* of the restricting wall 53 having the notched wall portion 52 to prevent the lock from being released. Even if an abrupt external force is exerted in the expanding direction B (FIG. 2) of the bent fuse unit 11, the lock is not released, whereby the reliability of the lock is retained.

Next, the second locking mechanism comprises an engaging projection 55 provided rearward of the side face wall 32*c*, 32*d* on both sides (left and right) of the front divided body 32, and an engagement groove 56 provided on the rear divided body 33.

As shown in FIGS. 4 to 6, the engaging projection 55 is form to project outward from the side face wall 32*c*, 32*d*. The engaging projection 55 has an engagement face 55*a* and an inclined face 55*b*. The inclined face 55*b* is provided to force the extension wall 36 having the engagement groove 56 on the engaging projection 55 more easily, whereby the lock can be effected by one touch. The engagement face 55*a* is a vertical face to the side face wall 32*c*, 32*d*, thereby preventing the lock from being released.

Also, the engaging projection 55 is located closer to the hinge portion 30. In this manner, the extension wall 36 formed on the partner divided body (rear divided body) 33 can have a reduced extension range. If the extension range is too large, the flexural rigidity of the extension wall 36 is lowered so that the lock is released easily.

The extension wall 36 is continued to the side face wall 33*c*, 33*d* of the rear divided body 33, extends forwards and downwards, and has flexibility. The forward extension range of the extension wall 36 is set to the extent that the extension wall may not interfere with the partner divided body.

Figure 8:
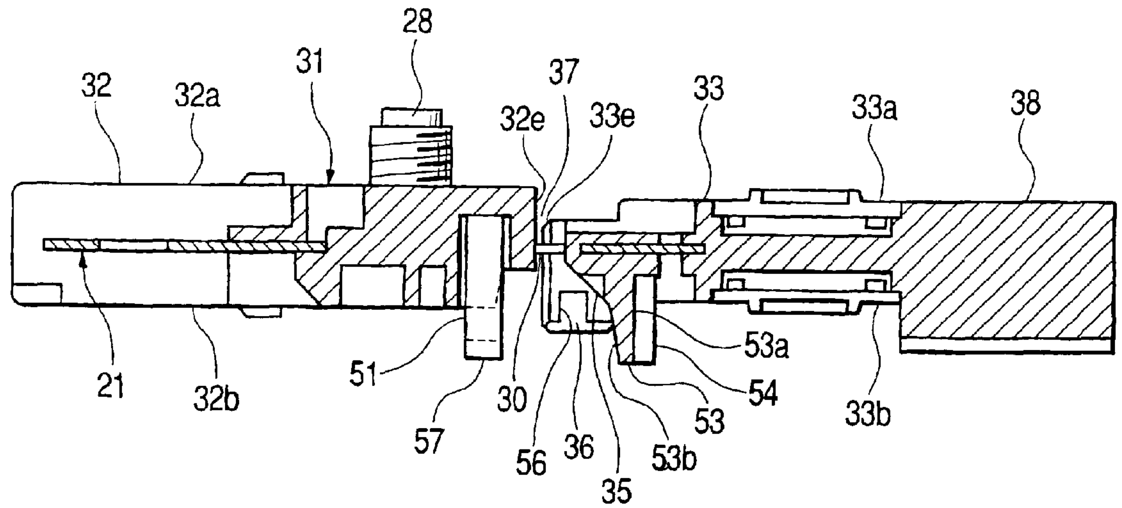
FIG. 8 is a cross-sectional view of the fuse unit of FIG. 5, taken along the line B—B.

As shown in FIG. 4 or 8, the engagement groove 56 provided on the inner side face of the extension wall 36 make a U-character shape in section, and has an opening at one end. The engagement groove 56 extends vertically (downward) in a state where the fuse unit 11 is expanded, or extends horizontally, diverted about 90 degrees, in a state where it is bent.

When the engaging projection 55 engages the engagement groove 56, the engaging projection 55 is carried between both the groove walls and positioned. Accordingly, the groove width of the engagement groove 56 is set to the extent that the groove walls can carry the engaging projection without rattling. The groove length h of the engagement groove 56 (see FIG. 4) is greater than one-thirds the height H of the extension wall 36, and smaller than half the height H in a state where both the divided bodies 32 and 33 are expanded. This is made to maintain both the divided bodies 32 and 33 in the L-character bent form, and to allow the engaging projection 55 to engage the engagement groove 56, even if the center of rotation of the divided bodies 32 and 33 is shifted (the center of rotation is not always fixed).

If the above constitution is applied to the fuse unit 11, the engaging projection 55 is rotated up to the position where it can engage the engagement groove 56, while the extension wall 36 of the rear divided body 33 rides on the engaging projection 55 of the front divided body 32, when the fuse unit 11 is bent. And the engaging projection 55 engages the engagement groove 56 to make contact with the groove walls, so that the rotation of the resin body 31 is restricted to produce the L-character bent form. The engagement groove 56 is diverted about 90 degrees from the vertical direction to the horizontal direction, whereby the fuse unit 11 is bent like the L-character shape.

By providing the dual locking mechanism, the reliability of the lock to abrupt external force exerting in an expanding direction B of the resin body 31 is increased to prevent the rattling and to retain the L-character bent form.

As shown in FIG. 8, the restricting wall 53 is stood on the inner face wall 33*b* of the rear divided body 33 in parallel to the hinge portion 30. This restricting wall 53 serves to maintain the divided bodies 32 and 33 in the L-character bent form, and acts as a stopper wall against an external force applied in a bent direction A (FIG. 2).

This restricting wall 53 is formed with an inclined wall surface 53*b* confronting the inner face wall 32*b* of the front divided body 32. The inclined wall surface 53*b* is inclined in a direction away from the inner face wall 32*b* of the front divided body 32 in a state where both the divided bodies 32 and 33 are bent. The wall thickness of the restriction wall 53 is set to the extent that the restriction wall 53 may not deform due to an external force, and to take the all possible measures against the deformation, the restriction wall 53 is formed with a tipping-resistant rib 54 at both ends.

By providing the inclined wall surface 53*b* on the restriction wall 53, both the divided bodies 32 and 33 can be bent over 90 degrees, and thereby maintained in the L-character bent form without causing the spring back.

The tipping-resistant rib 54 is formed substantially at right angles to the restriction wall 53 integrally, whereby the flexural rigidity of the restriction wall 53 is increased to prevent the deformation due to an external force in the bending direction A.

Figure 9:
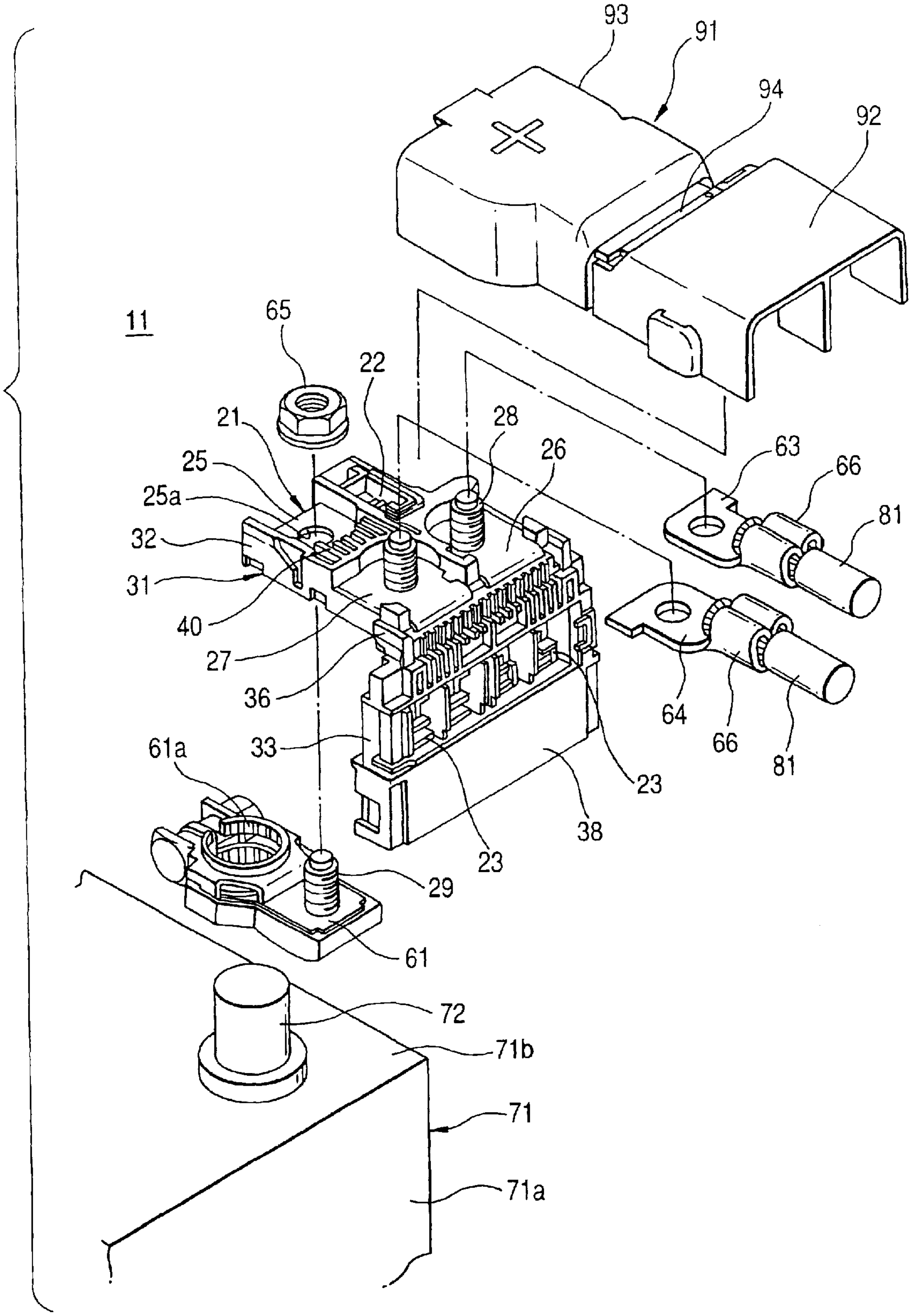
FIG. 9 is an explanatory view showing the fuse unit according to one embodiment of the invention in an assembled state.
Figure 10:
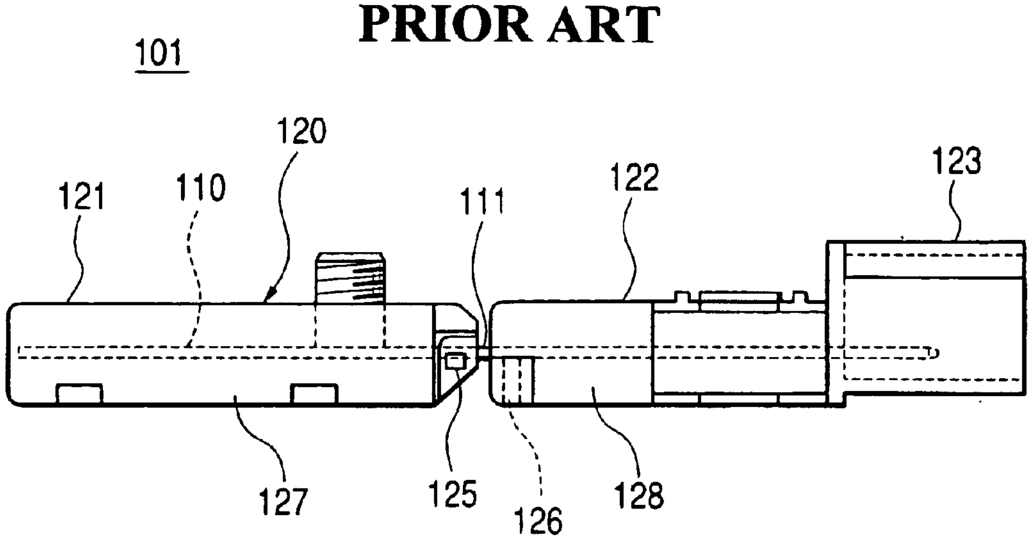
FIG. 10 PRIOR ART
FIG. 10 is a front view of a conventional fuse unit.
Figure 11:
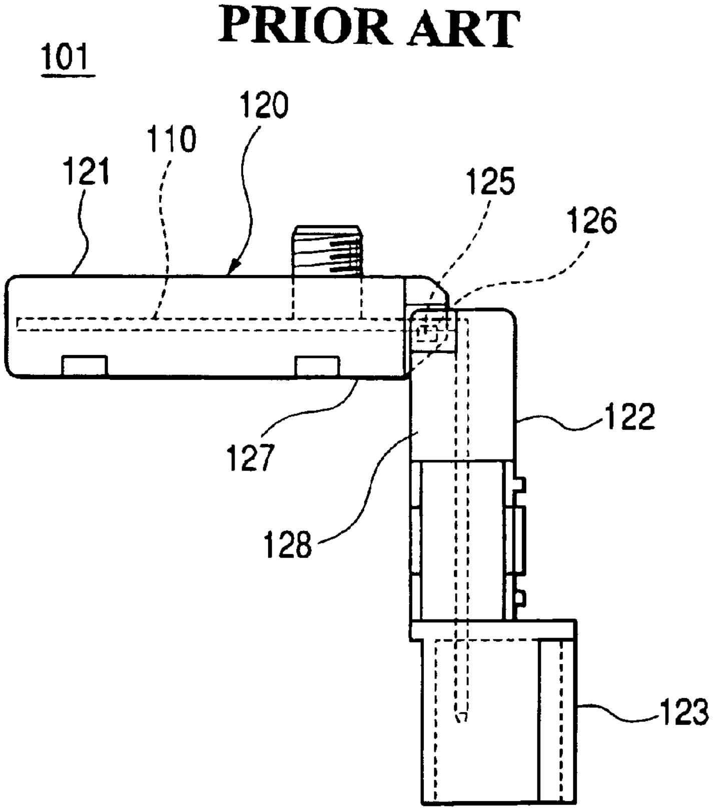
FIG. 11 PRIOR ART
FIG. 11 is an explanatory view showing the fuse unit in a bent state.

FIG. 9 is a view showing a situation where the fuse unit 11 is bent and assembled into the vehicle mounted battery 71. As illustrated, the fuse unit 11 has the battery terminal 61 tightened securely by a nut 65, with a stud bolt 29 engaged into a bolt insertion hole 25*a* of the terminal connection 25, and has the alternator terminal 63 and the stator motor terminal 64 tightened securely by a nut, with its insertion hole engaged by the stud bolt 28 projecting from the terminal connection 26, 27. The alternator terminal 63 and the stator motor terminal 64 are so-called wired terminals, in which the electric wire 81 is caulked and connected by a pair of pressure connecting pieces 66.

The front divided body 32 has the fuse 22 for connecting the connection 25 of the battery terminal 61 with the alternator terminal 63, and the rear divided body 33 has four fuses 23 arranged in parallel. Streak projections on the surface of the resin body 31 are a radiation fin 40.

A waterproof and dust proof protection cover 91 is disposed over the fuse unit 11. The protection cover 91 is divided into front and rear halves with the hinge portion 94 as a boundary. A rear cover 92 is attached by one touch on the side face wall 33*c*, 33*d* of the fuse unit 11 by engagement means. A front cover 93 is openable or closable around the hinge portion 94 as the center of rotation. The front cover 93 can be opened or closed to make the fuses 22 visible or permit the connection or maintenance of the terminals 61, 63 and 64. In a state where the protection cover 91 is disposed on the fuse unit 11, the front and rear covers 92 and 93 are placed on the same horizontal plane.

A method for manufacturing the fuse unit 11 is made in such a manner that the fuse element 21 is firstly punched from a conductive metal plate and set in the resin metal mold (not shown), and by injecting a molten resin material into the resin metal mold, the resin body 31 is integrally molded on both the front and back surfaces of the fuse element 21. Herein, the resin body 31 is made empty around the terminal connections 25, 26 and 27 and the fuses 22 and 23 to expose a conductive surface of the fuse element 21.

As described above, the restricting wall stood on the second divided body makes contact with the inner face wall of the first divided body that is the partner, thereby acting as a stopper wall, when both the divided bodies are bent. Accordingly, both the divided bodies have a higher reliability of the lock, and the fuse unit can be maintained in the L-character bent form.

Also, the divided bodies 32 and 33 can be bent over 90 degrees, avoiding a spring back from the face wall on the lock portion.

Also, the flexible arm is inserted through the opening of the notch, and the latch of the flexible arm engages the notched wall portion to effect the lock, so that the bent resin body is restricted from rotating in the expanding direction. Accordingly, the highly reliable locking mechanism can be provided and the fuse unit can be maintained in the L-character bent form more reliably.

Also, the flexible arm is inserted into the notched wall portion, and the latch of the flexible arm engages the engagement portion to effect the first lock, and the engaging projection engages the engagement groove to effect the second lock. Accordingly, the reliability of locking mechanism is increased with the dual lock.

Also, the flexible arm is inserted into the notch of the second divided body, and the latch of the flexible arm engages the engagement portion to effect the first lock, while at the same time the engaging projection provided on the side face wall of the one resin body is rotated to engage the engagement groove by flexing the extension wall of the other resin body outwards, thereby effecting the second lock. Accordingly, the reliability of locking mechanism is increased without releasing the second lock.

The function of restricting the bending can be effectively fulfilled without decreasing the flexural rigidity of the restricting wall. Since the flexible arm is disposed in the center, an external force applied on the latch is distributed uniformly, thereby preventing the lock from being released, so that the reliability of the lock mechanism is improved.

Since the wall thickness of the notched wall portion is increased and the strength of the notched wall portion is increased, the notched wall portion is not subjected to plastic deformation when the flexible arm is inserted into the notched wall portion, so that the lock is prevented from being released.

Since the restricting wall for accepting the external force is supported by the tipping-resistant rib, the flexure or plastic deformation of the restricting wall can be prevented, whereby the reliability of the bent form is improved.

What is claimed is:

1. A fuse unit comprising:

an electrically conductive fuse element having a plurality of fusible portions and formed with a flexible portion in an intermediate section; and a resin body containing said fuse element, said resin body being divided into a first divided body and a second divided body at a boundary of said flexible portion, said first divided body and said second divided body being bendable;

a restricting wall protruding from an inner face wall of said second divided body and confronting an inner face wall of said first divided body.

2. The fuse unit according to claim 1, wherein said restricting wall is provided with an inclined wall surface configured to be inclined away from the inner face wall of said first divided body.

3. The fuse unit according to claim 2, wherein said first divided body is provided with a flexible arm having a latch, and said restricting wall of said second divided body is provided with a notched wall portion in which a notch is formed, so that a first locking mechanism is constituted by said flexible arm and said notched wall portion.

4. The fuse unit according to claim 3, wherein said first divided body is provided with an engaging projection, and said second divided body is provided with an engagement groove engageable with said engaging projection, so that a second locking mechanism is constituted by said engaging projection and said engagement groove.

5. The fuse unit according to claim 4, wherein said flexible arm is provided on the inner face wall of said first divided body, said engaging projection is provided on a side face wall of said first divided body, and said engagement groove is provided on an extension wall from the side face wall of said second divided body.

6. The fuse unit according to claim 3, wherein said flexible arm is located closer to said flexible portion, and disposed in the center of said inner face wall of said first divided body.

7. The fuse unit according to claim 3, wherein said notched wall portion is thicker than that of said restricting wall.

8. The fuse unit according to claim 1, wherein a tipping-resistant rib is provided at both ends of said restricting wall.

9. The fuse unit according to claim 5, a groove length of the engagement groove is greater than one-thirds a height of the extension wall and smaller than half the height of the extension wall in a state where the first and second divided bodies are expanded.

10. The fuse unit according to claim 1, wherein the restricting wall confronts an inner face wall of said first divided body when said divided bodies are bent.

11. The fuse unit according to claim 3, wherein the restricting wall confronts an inner face wall of said first divided body when said divided bodies are bent.

12. The fuse unit according to claim 8, wherein the restricting wall confronts an inner face wall of said first divided body when said divided bodies are bent.

* * * * *